US012331852B2

(12) United States Patent
Brown et al.

(10) Patent No.: US 12,331,852 B2
(45) Date of Patent: Jun. 17, 2025

(54) SEAL SYSTEM FOR ANNULAR COMPONENTS

(71) Applicant: Schlumberger Technology Corporation, Sugar Land, TX (US)

(72) Inventors: Gareth Brown, Ellon (GB); Ross Stevenson, Sugar Land, TX (US); Kody Carrillo, Sugar Land, TX (US); Ian McDaniel, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 44 days.

(21) Appl. No.: 18/253,608

(22) PCT Filed: Sep. 23, 2021

(86) PCT No.: PCT/US2021/051719
§ 371 (c)(1),
(2) Date: May 19, 2023

(87) PCT Pub. No.: WO2022/108656
PCT Pub. Date: May 27, 2022

(65) Prior Publication Data
US 2024/0011562 A1    Jan. 11, 2024

Related U.S. Application Data

(60) Provisional application No. 63/198,876, filed on Nov. 19, 2020.

(51) Int. Cl.
*F16L 15/00*     (2006.01)
*E21B 17/042*    (2006.01)
*E21B 33/12*     (2006.01)

(52) U.S. Cl.
CPC .......... *F16L 15/003* (2013.01); *E21B 17/042* (2013.01); *E21B 33/1212* (2013.01); *F16L 15/004* (2013.01)

(58) Field of Classification Search
CPC ..... F16L 15/001; F16L 15/003; F16L 15/004; F16L 15/04; F16J 15/04; E21B 17/042; E21B 33/1212
See application file for complete search history.

(56) References Cited

U.S. PATENT DOCUMENTS 1,969,142 A  *  8/1934  McIntyre ................ F16L 19/14
                                                      411/270
2,258,066 A  * 10/1941  Oyen ...................... E21B 17/08
                                                      285/334.4

(Continued)

FOREIGN PATENT DOCUMENTS

EP      3260649 A1    12/2017
GB      2116276 A      9/1983
WO   2010047406 A1    4/2010

OTHER PUBLICATIONS

Partially Supplementary Search Report issued in European Patent Application No. 21895305.7 dated Sep. 18, 2024, 12 pages.

(Continued)

*Primary Examiner* — Nicholas L Foster
(74) *Attorney, Agent, or Firm* — Jeffrey D. Frantz

(57) ABSTRACT

A seal system includes a first annular component having a radially-outer surface with a first threaded portion and a first sealing portion, wherein the first sealing portion has a first angled surface that is oriented at a first angle relative to a vertical axis. The seal system also includes a second annular component having a radially-inner surface with a second threaded portion and a second sealing portion, wherein the second sealing portion has a second angled surface that is oriented at a second angle relative to the vertical axis, and the second angle is different from the first angle. The first annular component and the second annular component are configured to threadably couple to one another via the first threaded portion and the second threaded portion and to (Continued)

form a metal-to-metal seal against one another via the first angled surface and the second angled surface.

20 Claims, 10 Drawing Sheets

(56) References Cited

U.S. PATENT DOCUMENTS

| | | | | |
|---|---|---|---|---|
| 4,410,204 | A * | 10/1983 | Reimert | F16L 15/003 |
| | | | | 285/27 |
| 4,521,042 | A * | 6/1985 | Blackburn | E21B 17/08 |
| | | | | 285/391 |
| 4,736,967 | A * | 4/1988 | Mott | F16L 15/00 |
| | | | | 285/94 |
| 4,753,460 | A * | 6/1988 | Tung | E21B 17/0423 |
| | | | | 285/331 |
| 4,817,962 | A | 4/1989 | Mott et al. | |
| 5,275,845 | A | 1/1994 | Krings et al. | |
| 5,423,579 | A * | 6/1995 | Blose | F16L 15/04 |
| | | | | 285/334.4 |
| 6,059,321 | A * | 5/2000 | Lyall, III | F16L 21/022 |
| | | | | 285/139.2 |
| 6,349,979 | B1 * | 2/2002 | Noel | F16L 15/004 |
| | | | | 285/333 |
| 9,383,045 | B2 * | 7/2016 | Santi | F16L 15/003 |
| 9,500,305 | B2 * | 11/2016 | Lee | F16L 47/24 |
| 10,113,674 | B2 | 10/2018 | Martin et al. | |
| 10,443,765 | B2 | 10/2019 | Nagahama | |
| 11,473,373 | B2 * | 10/2022 | Mencaglia | F16L 15/001 |
| 2004/0084901 | A1 | 5/2004 | Church | |
| 2008/0265575 | A1 * | 10/2008 | Charvet-Quemin | |
| | | | | E21B 17/042 |
| | | | | 285/331 |
| 2010/0102553 | A1 | 4/2010 | Patureau et al. | |
| 2010/0181761 | A1 * | 7/2010 | Santi | F16L 15/003 |
| | | | | 285/332.2 |
| 2014/0262213 | A1 | 9/2014 | Delange et al. | |
| 2016/0215906 | A1 * | 7/2016 | Lee | F16L 13/168 |
| 2019/0010767 | A1 | 1/2019 | Goto | |

OTHER PUBLICATIONS

International Preliminary Report on Patentability of International Patent Application No. PCT/US2021/051719 dated Jun. 1, 2023, 8 pages.

Extended Search Report issued in European Patent Application No. 21895305.7 dated Dec. 12, 2024, 10 pages.

Substantive Exam issued in Saudi Arabia Patent Application No. 523440846 dated Mar. 10, 2024, 11 pages.

* cited by examiner

SEAL SYSTEM FOR ANNULAR COMPONENTS

CROSS-REFERENCE TO RELATED APPLICATION

This application is a National Stage Entry of International Patent Application No. PCT/US2021/051719, filed on Sep. 23, 2021, which claims priority to and benefit of U.S. Provisional Application No. 63/198,876, entitled "SEAL SYSTEM FOR ANNULAR COMPONENTS" and filed on Nov. 19, 2020, which is incorporated by reference herein in its entirety for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be noted that these statements are to be read in this light, and not as admissions of prior art.

Natural resources, such as oil and gas, are used as fuel to power vehicles, heat homes, and generate electricity. Once a desired natural resource is discovered below the surface of the earth, mineral extraction systems are often employed to access and extract the desired natural resource. The mineral extraction systems may be located onshore or offshore depending on the location of the desired natural resource. The mineral extraction systems generally include a wellhead assembly positioned above a well. The mineral extraction systems may also include pressure control equipment positioned above the wellhead assembly. The pressure control equipment may be used to carry out intervention operations to inspect or to service the well and/or to carry out other supportive functions.

SUMMARY

This summary is provided to introduce a selection of concepts that are further described below in the detailed description. This summary is not intended to identify key or essential features of the claimed subject matter, nor is it intended to be used as an aid in determining or limiting the scope of the claimed subject matter as set forth in the claims.

In one embodiment, a seal system includes a first annular component having a radially-outer surface with a first threaded portion and a first sealing portion, wherein the first sealing portion has a first angled surface that is oriented at a first angle relative to a vertical axis. The seal system also includes a second annular component having a radially-inner surface with a second threaded portion and a second sealing portion, wherein the second sealing portion has a second angled surface that is oriented at a second angle relative to the vertical axis, and the second angle is different from the first angle. The first annular component and the second annular component are configured to threadably couple to one another via the first threaded portion and the second threaded portion and to form a metal-to-metal seal against one another via the first angled surface and the second angled surface.

In one embodiment, a lubricator for a pressure control equipment stack includes a first annular lubricator section comprising a radially-outer surface with a first sealing portion, wherein the first sealing portion includes a first angled surface that is oriented at a first angle relative to a vertical axis. The lubricator also includes a first annular connector component comprising a radially-inner surface with a second sealing portion, wherein the second sealing portion includes a second angled surface that is oriented at a second angle relative to the vertical axis, and the second angle is different from the first angle. Additionally, the first annular lubricator section and the first annular connector component are configured to couple to one another and to form a metal-to-metal seal against one another via the first angled surface and the second angled surface.

In one embodiment, a method of sealing a first annular component to a second annular component includes positioning the first annular component within the second annular component. The method also includes rotating at least one of the first annular component and the second annular component to thereby threadably couple the first annular component to the second annular component via a threaded interface and until only a first portion of a first angled surface of the first annular component contacts and forms a metal-to-metal seal against only a second portion of a second angled surface of the second annular component.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be noted that in the development of any such actual implementation, as in any engineering or design project, numerous implementations-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," "said," and the like, are intended to mean that there are one or more of the elements. The terms "comprising," "including," "having," and the like are intended to be inclusive and mean that there may be additional elements other than the listed elements. The use of "top," "bottom," "above," "below," and variations of these terms is made for convenience, but does not require any particular orientation of the components relative to some fixed reference, such as the direction of gravity. The term "fluid" encompasses liquids, gases, vapors, and combinations thereof. Numerical terms, such as "first," "second," and "third" are used to distinguish components to facilitate discussion, and it should be noted that the numerical terms may be used differently or assigned to different elements in the claims.

The present embodiments generally relate to a seal system (e.g., metal-to-metal seal system) that is configured to form an annular seal (e.g., annular metal-to-metal seal) between annular components. For example, the seal system may be used to form annular seals between lubricator sections and connectors to form a lubricator for a pressure control equipment (PCE) stack for a mineral extraction system (e.g., a drilling system, a production system). However, while the seal system is shown and described with reference to lubricator sections of the PCE stack to facilitate discussion, it should be appreciated that the seal system may be adapted for use with any of a variety of annular components (e.g., pipes, connectors).

Figure 1:
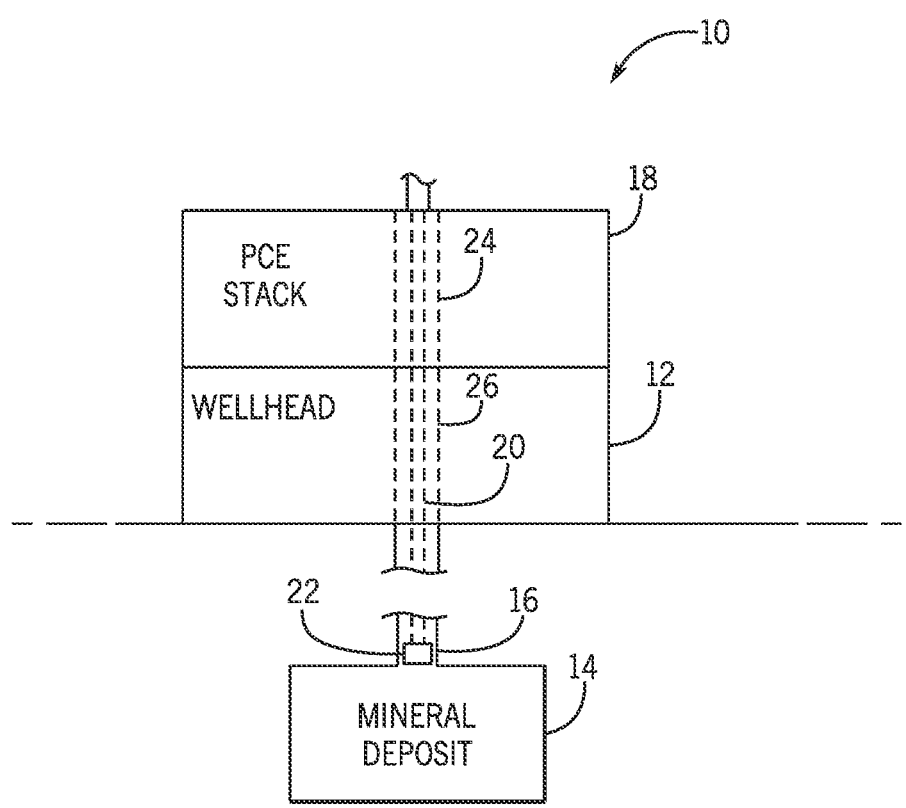
FIG. 1 is a schematic diagram of a system having a pressure control equipment (PCE) stack, in accordance with an embodiment of the present disclosure.

With the foregoing in mind, FIG. 1 is a schematic diagram of an embodiment of a system 10 (e.g., a mineral extraction system, a drilling system, a production system). The system 10 includes a wellhead 12 (e.g., a wellhead assembly), which is coupled to a mineral deposit 14 via a wellbore 16. The wellhead 12 may include any of a variety of components such as a spool, a hanger, and a "Christmas" tree. In the illustrated embodiment, a pressure control equipment (PCE) stack 18 is coupled to the wellhead 12 to facilitate intervention operations, which may be carried out by lowering a conduit 20 (e.g., a communication conduit, a wireline, a slickline, a spoolable rod, or a coiled tubing) and/or a tool 22 (e.g., configured to collect data about the mineral deposit 14 and/or the wellbore 16) through a bore 24 defined by the PCE stack 18, through a bore 26 defined by the wellhead 12, and into the wellbore 16. As discussed in more detail below, the PCE stack 18 may include a stuffing box, a tool catcher, a tool trap, and a lubricator (e.g., formed of lubricator sections that are connected end-to-end via connectors). The PCE stack 18 may also include a valve that seals about the conduit 20 to isolate the environment, as well as other surface equipment, from pressurized fluid within the wellbore 16.

Figure 2:
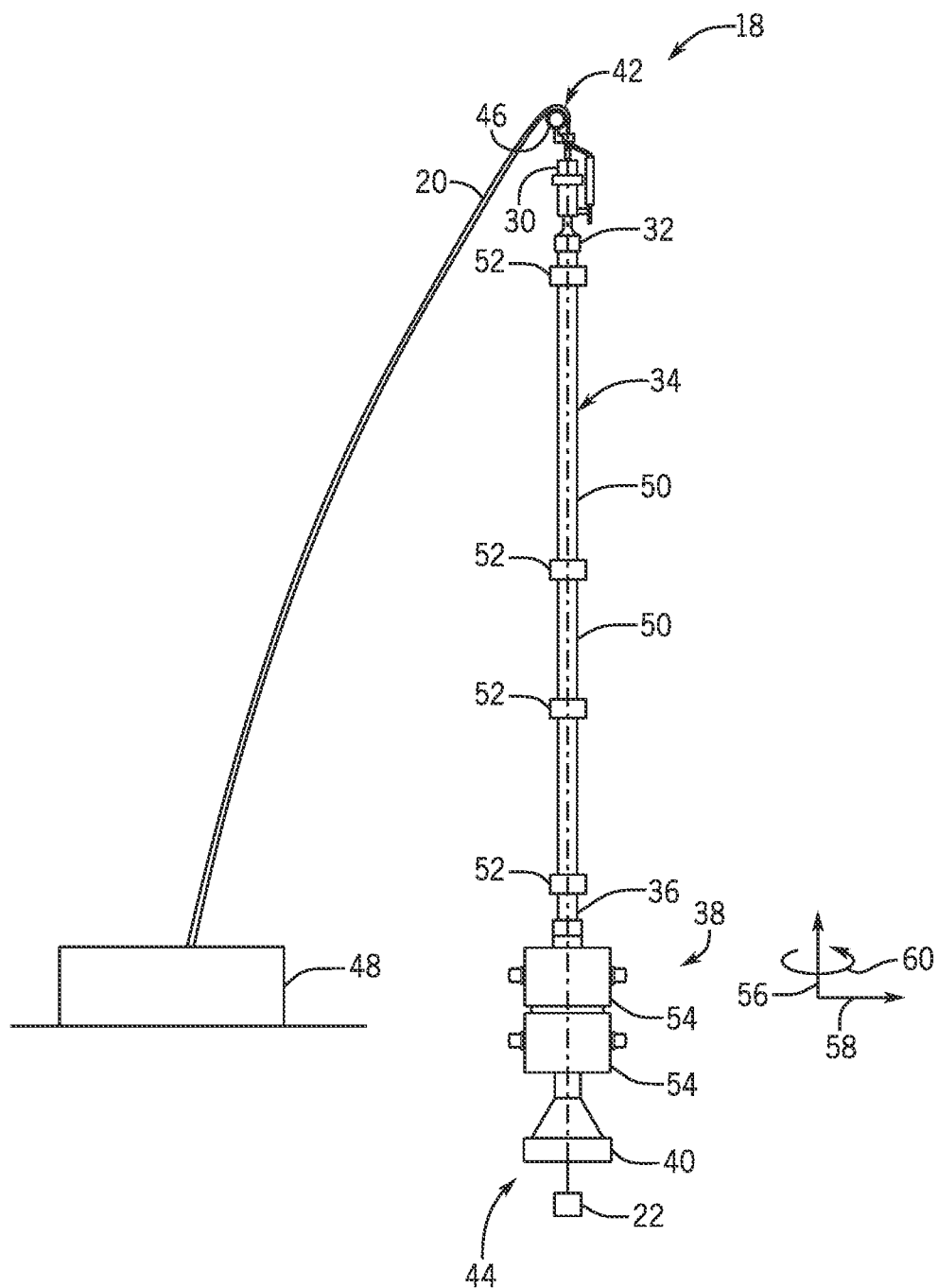
FIG. 2 is a side view of the PCE stack of FIG. 1, in accordance with an embodiment of the present disclosure.

FIG. 2 is a side view of an embodiment of the PCE stack 18 that may be used in the system 10 of FIG. 1. In the illustrated embodiment, the PCE stack 18 includes a stuffing box 30, a tool catcher 32, a lubricator 34, a tool trap 36, a valve stack 38, and a wellhead connector 40 to couple the PCE stack 18 to the wellhead 12 (FIG. 1) or other structure. These components are annular structures stacked vertically with respect to one another (e.g., end-to-end, coaxial) to enable the conduit 20 to extend through the PCE stack 18 (e.g., from a first end 42 to a second end 44 of the PCE stack 18) into the wellhead 12. As shown, the conduit 20 extends from the first end 42 of the PCE stack 18 and over a sheave 46 to a winch 48, and rotation of the winch 48 (e.g., of a drum or spool of the winch 48) raises and lowers the conduit 20 with the tool 22 through the PCE stack 18. It should be noted that the PCE stack 18 may include various other components (e.g., a pump-in sub to enable fluid injection) and/or may omit any of the components shown in FIG. 2.

In the PCE stack 18, the stuffing box 30 is configured to seal against the conduit 20 (e.g., to seal an annular space about the conduit 20) to block a flow of fluid from the bore 24 (FIG. 1) vertically above the stuffing box 30. The tool catcher 32 is configured to engage or catch the tool 22 to block the tool 22 from being withdrawn vertically above the tool catcher 32 and/or to block the tool 22 from falling vertically into the wellbore 16 while the tool catcher 32 is in a closed position. The lubricator 34 may include one or more lubricator sections 50 (e.g., annular pipes; tubulars), which may be coupled to one another and/or to adjacent components (e.g., the tool catcher 32, the tool trap 36) via connectors 52 (e.g., quick connectors). The lubricator 34 may support or surround the tool 22 while the tool 22 is inserted into and/or withdrawn from the wellbore 16. The tool trap 36 is configured to block the tool 22 from falling vertically into the wellbore 16 while the tool trap 36 is in a closed position.

As shown, the valve stack 38 may include one or more valves 54 that are configured to seal the bore 24. In the illustrated embodiment, the valve stack 38 includes two valves 54 that are vertically stacked relative to one another. However, the valve stack 38 may include any suitable number of valves 54 (e.g., 1, 2, 3, 4, or more). At least one of the one or more valves 54 may include rams that are driven between an open position in which the rams do not seal the bore 24 and a closed position in which the rams seal the bore 24 (e.g., seal about the conduit 20 to seal the bore 24), thereby blocking fluid flow through the bore 24.

To facilitate discussion, the PCE stack 18 and its components may be described with reference to a vertical axis or direction 56, a radial axis or direction 58, and a circumferential axis or direction 60. As discussed in more detail below, a seal system may be utilized to form a seal (e.g., annular seal) at each of the connectors 52 (e.g., between a first end of a first lubricator section 50 and a first connector 52, between a second end of the first lubricator section 50 and a second connector 52, between a first end of a second lubricator section 50 and the first connector 52, between a second end of the second lubricator section 50 and a third connector 52, and so on) to thereby provide a sealed bore (e.g., passageway) along an entire length of the lubricator 34. It should be appreciated that the seal system may be utilized to form the seal between any of a variety of annular components (e.g., pipes, connectors) in the PCE stack 18 or in any other type of stack or system (e.g., of the system 10 of FIG. 1 or any other system).

Figure 3:
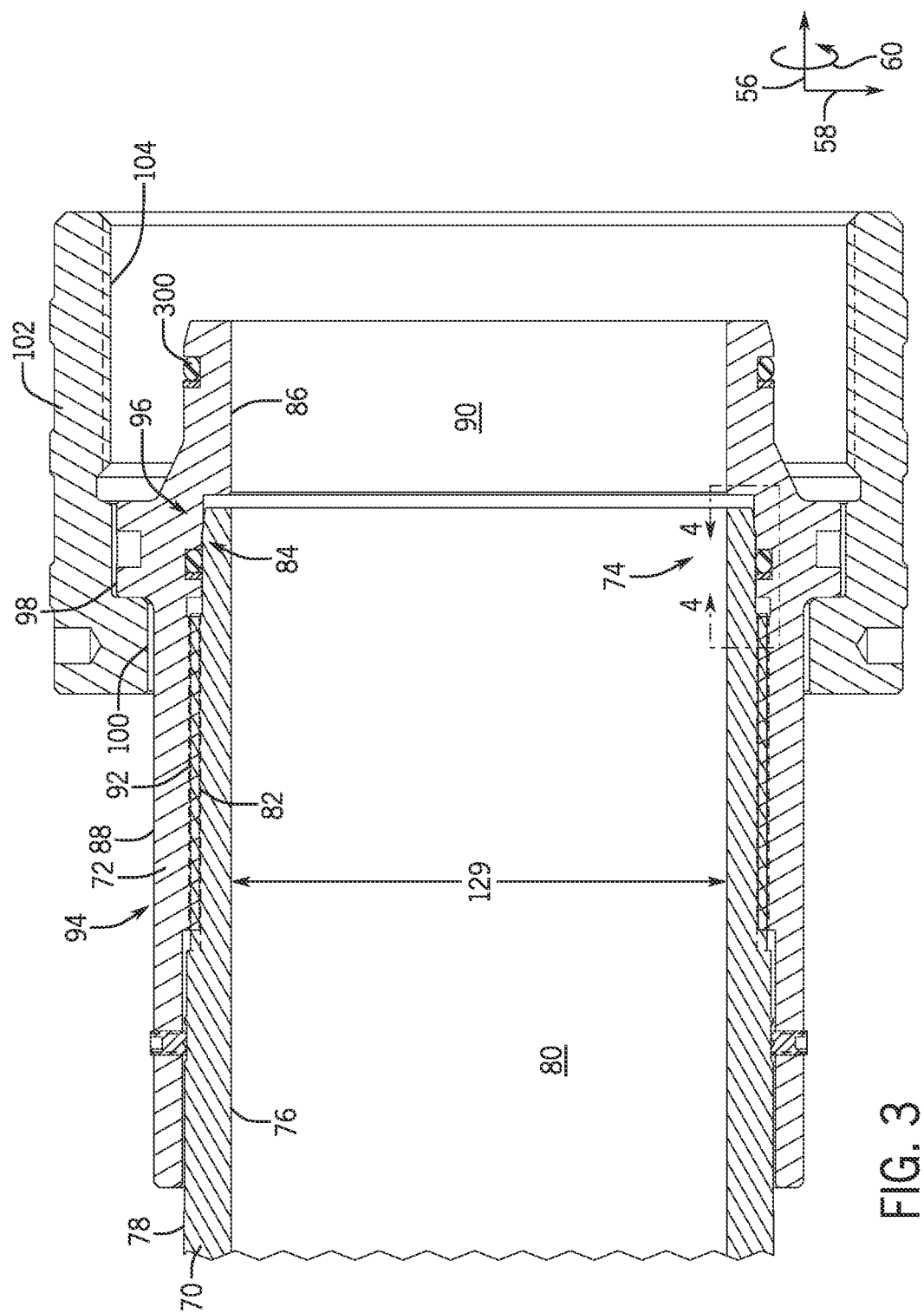
FIG. 3 is a cross-sectional side view of a seal system that may be used to form an annular seal between a first annular component and a second annular component, wherein the seal system is a bevel-type seal system and may be used in the PCE stack of FIG. 1, in accordance with an embodiment of the present disclosure.

FIG. 3 is a cross-sectional side view of a first annular component 70 and a second annular component 72 that are sealed together via a seal system 74 (e.g., metal-to-metal seal system), in accordance with an embodiment of the present disclosure. The first annular component 70 may be formed from a first material, and the second annular component 72 may be formed from a second material that is different than the first material. The first material (and thus, the first annular component 70) may have a first yield strength, and the second material (and thus, the second annular component 72) may have a second yield strength that is different than the first yield strength.

In some embodiments, the first yield strength may be greater than the second yield strength. For example, the second yield strength may be between about 5 to 50, 8 to 30, or 10 to 20 percent of the first yield strength, or the second yield strength may be less than or equal to about 50, 30, 20, or 10 percent of the first yield strength. Furthermore, the first yield strength may be between about 25 to 500 Megapascal (MPa), 50 to 250 MPa, or 55 to 100 MPa, or the first yield strength may be less than or equal to about 50, 55, 60, 65, 75, or 100 MPa. The second yield strength may be between about 100 to 1000 MPa, 500 to 750 MPa, or 600 to 700 MPa, or the second yield strength may be greater than or equal to about 100, 250, 500, 600, or 700 MPa. As an example, the first material may be a high alloy metal (e.g., high alloy steel) and the second material may be a low alloy metal (e.g., low alloy steel).

As shown, the first annular component 70 is a pipe section and the second annular component 72 is a connector (e.g., part of a connector). In such cases, it may be advantageous for the first annular component 70 to have the first yield strength that is greater than the second yield strength of the second annular component 72. This may enable the first annular component 70 to be strong and light weight, even if the first annular component 70 has a thin wall and is long in length. However, while the first annular component 70 is described as having the first material with the first yield strength, and the second annular component 72 is described as having the second material with the second yield strength herein to facilitate discussion, it should be appreciated that other variations are envisioned. For example, the first annular component 70 may have the first yield strength that is less than the second yield strength of the second annular component 72 (e.g., with any appropriate properties disclosed herein, such as the percentage difference in yield strength and/or the first annular component 70 being formed from the low alloy metal and the second annular component 72 being formed the high alloy metal).

Regardless of whether the first annular component 70 has the first yield strength that is greater than or less than the second yield strength of the second annular component 72, the difference in yield strength causes one of the annular components 70, 72 (e.g., the one with the lower yield strength) to yield first during make up (e.g., connection) of the annular components 70, 72, which may facilitate formation of an annular seal between the annular components 70, 72 (e.g., effective annular seal and/or with low torque). It should be appreciated that, in some embodiments, the first annular component 70 and the second annular component 72 may be formed from the same material and/or may have the same (e.g., the same or substantially the same) yield strength.

As noted above, it should be appreciated that the first annular component 70 may be a pipe section or a lubricator section, such as the lubricator section 50 of the lubricator 34 in FIG. 2, and the second annular component 72 may be a connector (e.g., part of the connector), such as the connector 52 in FIG. 2. However, as noted above, the first annular component and the second annular component 72 may be any of a variety of annular components (e.g., pipes, connectors) in the PCE stack 18 of FIG. 2 or in any other type of stack or system (e.g., of the system 10 of FIG. 1 or any other system). To facilitate discussion, the first annular component 70, the second annular component 72, and the seal system 74 may also be described with reference to the vertical axis or direction 56, the radial axis or direction 58, and the circumferential axis or direction 60.

As shown, the first annular component 70 includes a radially-inner surface 76 (e.g., annular surface) and a radially-outer surface 78 (e.g., annular surface). The radially-inner surface 76 defines and surrounds a central bore 80, and the radially-outer surface 78 includes a threaded portion 82 and a sealing portion 84. The second annular component 72 includes a radially-inner surface 86 (e.g., annular surface) and a radially-outer surface 88 (e.g., annular surface). The radially-inner surface 86 defines and surrounds a central bore 90 that is configured to be fluidly coupled to the central bore 80 (e.g., coaxial). The radially-inner surface 86 also includes a threaded portion 92 that is configured to threadably couple to the threaded portion 82 to form a threaded interface 94 (e.g., threaded coupling) that joins the first annular component 70 to the second annular component 72, and the radially-inner surface 86 also includes a sealing portion 96.

In some embodiments, such as where the second annular component 72 is part of the connector (e.g., a quick union connector) that is positioned to connect the first annular component 70 to another annular component (e.g., a third annular component, such as to another lubricator section 50 of the lubricator 34 of FIG. 2), the radially-outer surface 88 may include one or more features (e.g., radially-outwardly extending protrusion 98) that are configured to engage one or more corresponding features (e.g., radially-inwardly extending protrusion 100) of a collar 102 (e.g., annular collar) of the connector. As discussed in more detail below, in such cases, another part of the connector may be threadably coupled to the collar 102 via a threaded portion 104 of the collar 102.

In operation, to couple the first annular component 70 to the second annular component 72, the first annular component 70 may be positioned within the second annular component 72. The first annular component 70 and/or the second annular component 72 may be rotated to make up the threaded interface 94 and to bring the sealing portion 84 of the first annular component 70 and the sealing portion 96 of the second annular component 72 together (e.g., along the vertical axis 56) to form a seal (e.g., annular seal). Once the sealing portions 84, 96 form the seal, the central bore 80 and the central bore 90 are fluidly coupled and sealed together, such that fluid within the central bores 80, 90 is blocked from traveling across the seal. When used within the PCE stack 18 of FIG. 2, the central bores 80, 90 may form part of the bore 24 through the PCE stack 18.

Figure 4:
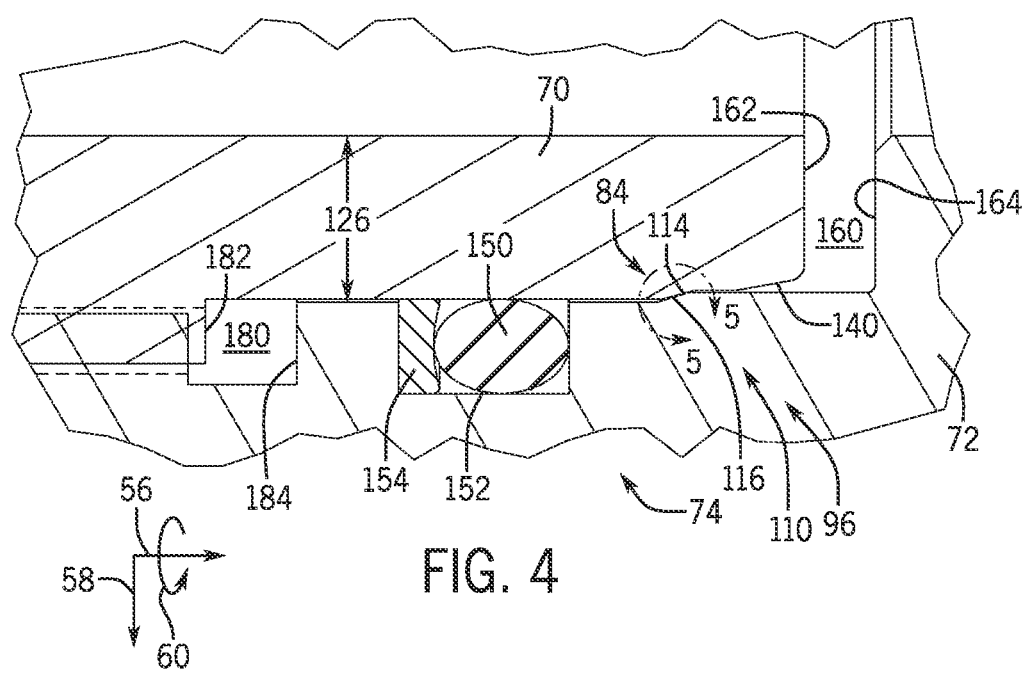
FIG. 4 is a cross-sectional side view of a portion of the seal system of FIG. 3 taken within line 4-4 of FIG. 3, in accordance with an embodiment of the present disclosure.
Figure 5:
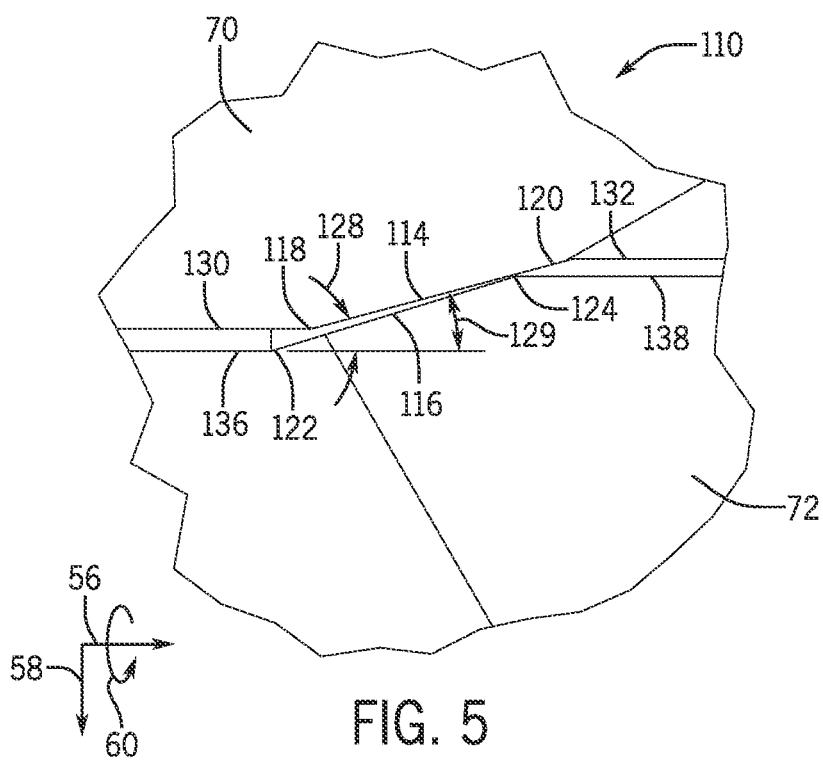
FIG. 5 is a cross-sectional side view of a portion of the seal system of FIG. 3 taken within line 5-5 of FIG. 4, in accordance with an embodiment of the present disclosure.

FIG. 4 is a cross-sectional side view of an embodiment of a portion of the seal system 74 taken within line 4-4 of FIG. 3, and FIG. 5 is a cross-sectional side view of an embodiment of a portion of the seal system 74 taken within line 5-5 of FIG. 4. As shown in FIGS. 4 and 5, a metal-to-metal seal interface 110 is formed by the sealing portion 84 of the first annular component 70 and the sealing portion 96 of the second annular component 72.

In particular, the sealing portion 84 of the first annular component 70 includes an angled surface 114 (e.g., frustoconical surface) and the sealing portion 96 of the second annular component 72 includes an angled surface 116 (e.g., frustoconical surface). The angled surfaces 114, 116 are configured to contact one another to form the metal-to-metal seal interface 110 and to provide the seal (e.g., primary seal; metal-to-metal seal). As best shown in FIG. 5, the angled surface 114 may include a first end 118 and a second end 120, and the first end 118 may be positioned radially-outwardly of the second end 120. Similarly, the angled surface 116 may include a first end 122 and a second end 124, and the first end 122 may be positioned radially-outwardly of the second end 124. Thus, the angled surfaces 114, 116 may taper in a same direction along the vertical axis 56. In view of the taper and position of the angled surface 114, 116, the seal system 74 may be referred to herein as a bevel-type seal system (e.g., intermediate bevel).

The angled surfaces 114, 116 may have respective lengths (e.g., between respective first and second ends) that are the same or different from one another. The angled surfaces 114, 116 may have respective lengths that are between approximately 0.25 to 2 centimeters (cm), 0.5 to 1.5 cm, or 0.75 to 1.25 cm, for example. In some embodiments, a respective length of the angled surface 114 may be less than a respective length of the angled surface 116. In some embodiments, an inner diameter 129 (FIG. 3) of the first annular component 70 may be between approximately 8 to 20 cm, 10 to 18 cm, or 12 to 15 cm, for example. In some embodiments, the respective lengths of the angled surfaces 114, 116 may be between approximately 2 to 20 percent, 5 to 15 percent, or 8 to 10 percent of the inner diameter 129 of the first annular component 70. The first annular component 70 may have a wall thickness 126 at or around the sealing portion 84 that is between approximately 0.5 to 3 cm, 1 to 2.5 cm, or 1.5 to 2 cm or any other suitable dimension to thereby provide appropriate stiffness and/or other properties that support the seal (e.g., enables pressure within the central bore 80 to deform the first annular component 70 to increase internal stress between the angled surfaces 114, 116).

The angled surfaces 114, 116 may be oriented at respective angles relative to the vertical axis 56, and the respective angles may be the same or different. In some embodiments, the angled surface 114 is oriented at a respective angle 128 and the angled surface 116 is oriented at a respective angle 129 that is different than the respective angle 128. For example, the respective angle 128 may be approximately 1 to 10 degrees or 1 to 5 degrees less than the respective angle 129. The respective angle 128 may be between 5 to 25 degrees, 10 to 20 degrees, or 12 to 18 degrees, and the respective angle 129 may be between 5 to 25 degrees, 10 to 20 degrees, or 12 to 18 degrees. The respective angles 128, 129 may be designed so that the respective angle 128 is less than the respective angle 129 across all acceptable or expected manufacturing tolerances (e.g., of plus or minus 1, 2, or more degrees).

It should be appreciated that the angled surfaces 114, 116 may contact each other along an entirety of the angled surface 114, an entirety of the angled surface 116, along only a portion of the angled surface 114, and/or along only a portion of the angled surface 116. For example, the angled surface 114 may contact only a portion of the angled surface 116 that is proximate to the second end 124 of the angled surface 116 (e.g., closer to the second end 124 than the first end 118) and/or may not contact a portion of the angled surface 116 that is proximate to the first end 122 of the angled surface 116 (e.g., closer to the first end 122 than the second end 124) due to relative dimensions of the first annular component 70 and the second annular component 72. Furthermore, the respective angle 128 being less than the respective angle 129 may facilitate contact with the angled surface 116 and formation of the seal along only a portion of the angled surface 114 that is proximate to the second end 120 of the angled surface 114 (e.g., closer to the second end 120 than the first end 118). For example, the angled surfaces 114, 116 may contact one another at the portion of the angled surface 114 that is proximate to the second end 120 of the angled surface 114, but the angled surfaces 114, 116 may be separated from one another (e.g., along the radial axis 58) at a portion of the angled surface 114 that is proximate to the first end 118 of the angled surface 114 (e.g., closer to the first end 118 than the second end 120).

As best shown in FIG. 5, the first annular component 70 may include a first vertically-extending surface 130 on a first side of the angled surface 114 and/or a second vertically-extending surface 132 on a second side of the angled surface 114 along the vertical axis 56. Similarly, the second annular component 72 may include a first vertically-extending surface 136 on a first side of the angled surface 116 and/or a second vertically-extending surface 138 on a second side of the angled surface 116 along the vertical axis 56. At least respective portions of the first vertically-extending surfaces 130, 136 may be separated from one another along the radial axis 58 and/or at least respective portions of the second vertically-extending surfaces 132, 138 may be separated from one another along the radial axis 58. As best shown in FIG. 4, in some embodiments, the first annular component 70 may also include an angled end surface 140 (e.g., frustoconical surface) that assists with initial placement of the first annular component 70 within the second annular component 72.

With reference to FIG. 4, the seal system 74 may also include an annular seal element 150 (e.g., o-ring) positioned within an annular groove 152, which may be formed in the second annular component 72. The annular seal element 150 may be a non-metal material, such as an elastomer material, and may form a secondary seal (e.g., annular seal; additional or back-up seal) between the first annular component 70 and the second annular component 72. As shown, a support ring 154 may be provided in the annular groove 152 to support the annular seal element 150. However, it should be appreciated that the annular seal element 150 may have any of a variety of other configurations (e.g., c-ring; metal material).

Advantageously, the angled surfaces 114, 116 are positioned on the first annular component 70 and the second annular component 72, respectively, such that a space 160 (e.g., a vertically-extending space or gap) is provided between an end surface 162 (e.g., vertically-facing surface) of the first annular component 70 and an end surface 164 (e.g., vertically-facing surface) of the second annular component 72 while the angled surfaces 114, 116 contact one another to form the seal. The end surface 162, 164 may be spaced apart from one another to account for manufacturing tolerances (e.g., in locations of the angled surfaces 114, 116 along the vertical axis 56) and to provide the space 160 across all acceptable or expected manufacturing tolerances. For example, the end surfaces 162, 164 may be spaced apart from one another by between approximately 1 to 8 cm, 2 to 5 cm, or 3 to 4 cm. It should be appreciated that other surfaces of the first annular component 70 and the second annular component 72 may be spaced apart in a similar manner and/or by a similar amount. For example, as shown in FIG. 4, a space 180 (e.g., a vertically-extending space or gap) may be provided between a surface 182 (e.g., vertically-facing surface) of the first annular component 70 and a surface 184 (e.g., vertically-facing surface) of the second annular component 72 while the angled surfaces 114, 116 contact one another to form the seal. In this way, the other surfaces or portions of the first annular component 70 and the second annular component 72 do not interfere with or reduce the internal stress between the angled surfaces 114, 116 that enables the angled surfaces 114, 116 to provide a reliable high-pressure seal (e.g., to seal fluid, such as wellbore fluid, that has a pressure that is approximately equal to or less than about 30, 50, 60, 70, 80, 90, 100 Megapascals [MPa] or more).

Figure 6:
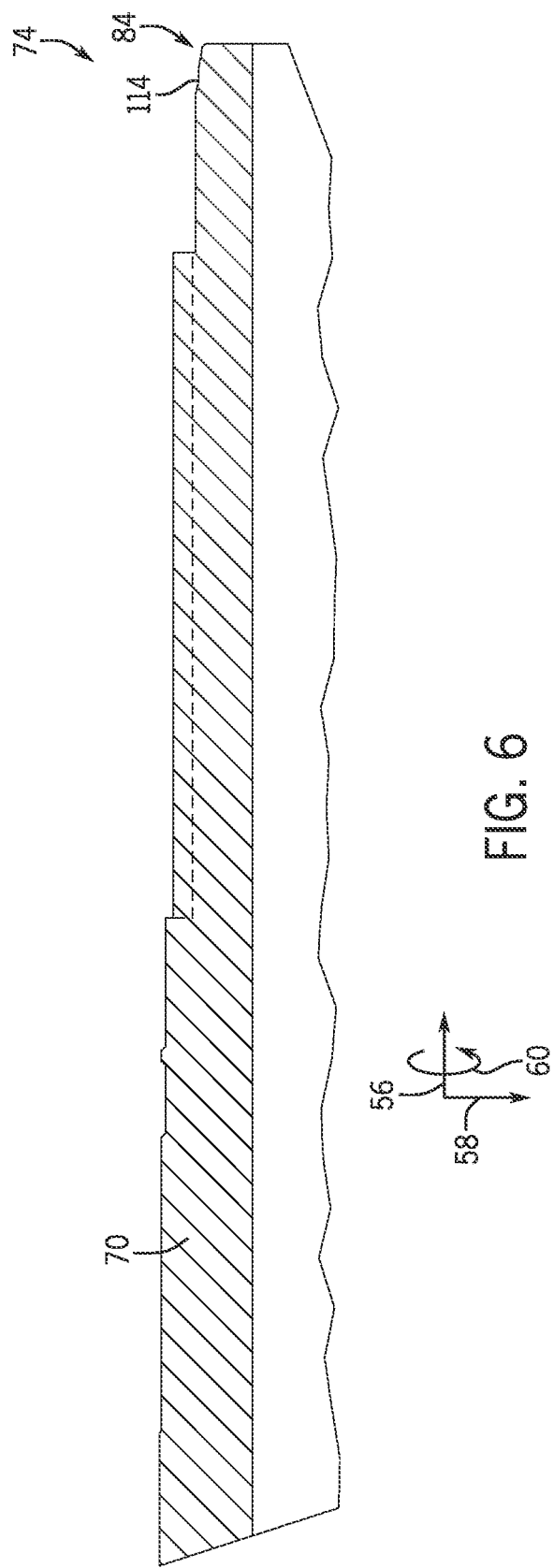
FIG. 6 is a cross-sectional side view of a portion of the first annular component of FIG. 3, in accordance with an embodiment of the present disclosure.
Figure 7:
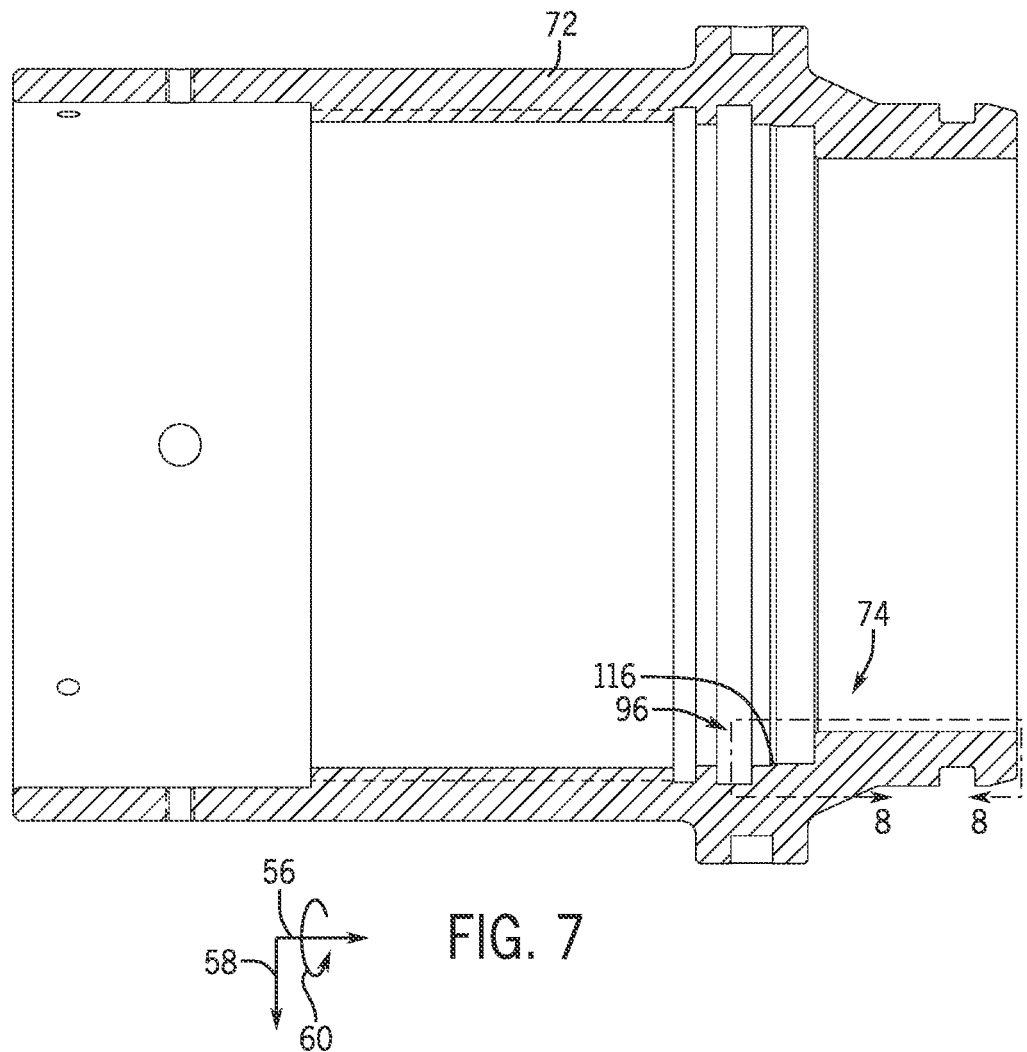
FIG. 7 is a cross-sectional side view of the second annular component of FIG. 3, in accordance with an embodiment of the present disclosure.
Figure 8:
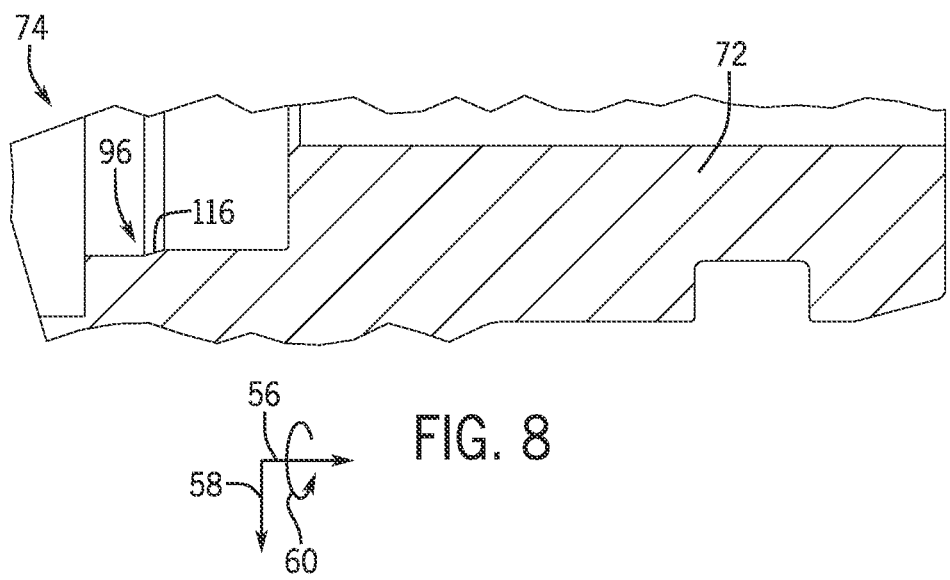
FIG. 8 is a cross-sectional side view of a portion of the second annular component of FIG. 3 taken within line 8-8 of FIG. 7, in accordance with an embodiment of the present disclosure.

FIGS. 6-8 provide additional views of components of the seal system 74. In particular, FIG. 6 is a cross-sectional side view of a portion of the first annular component 70, in accordance with an embodiment of the present disclosure. FIG. 7 is a cross-sectional side view of the second annular component 72, in accordance with an embodiment of the present disclosure. FIG. 8 is a cross-sectional side view of a portion of the second annular component 72 taken within line 8-8 of FIG. 7. As discussed in more detail below, it should be appreciated that the seal system 74 may be provided at a first end (e.g., end portion) and/or a second end (e.g., end portion) of the first annular component 70 to thereby seal the first annular component 70 to multiple adjacent structures (e.g., to the second annular component 72 and to an additional structure, such as an additional connector, that has features that are the same as or similar to the features of the second annular component 72). Thus, the seal system 74 may be used to couple and seal together multiple annular components to form a sealed bore (e.g., end-to-end; to form a portion of the bore 24 of the lubricator 34 of the PCE stack 18 of FIG. 2).

Figure 9:
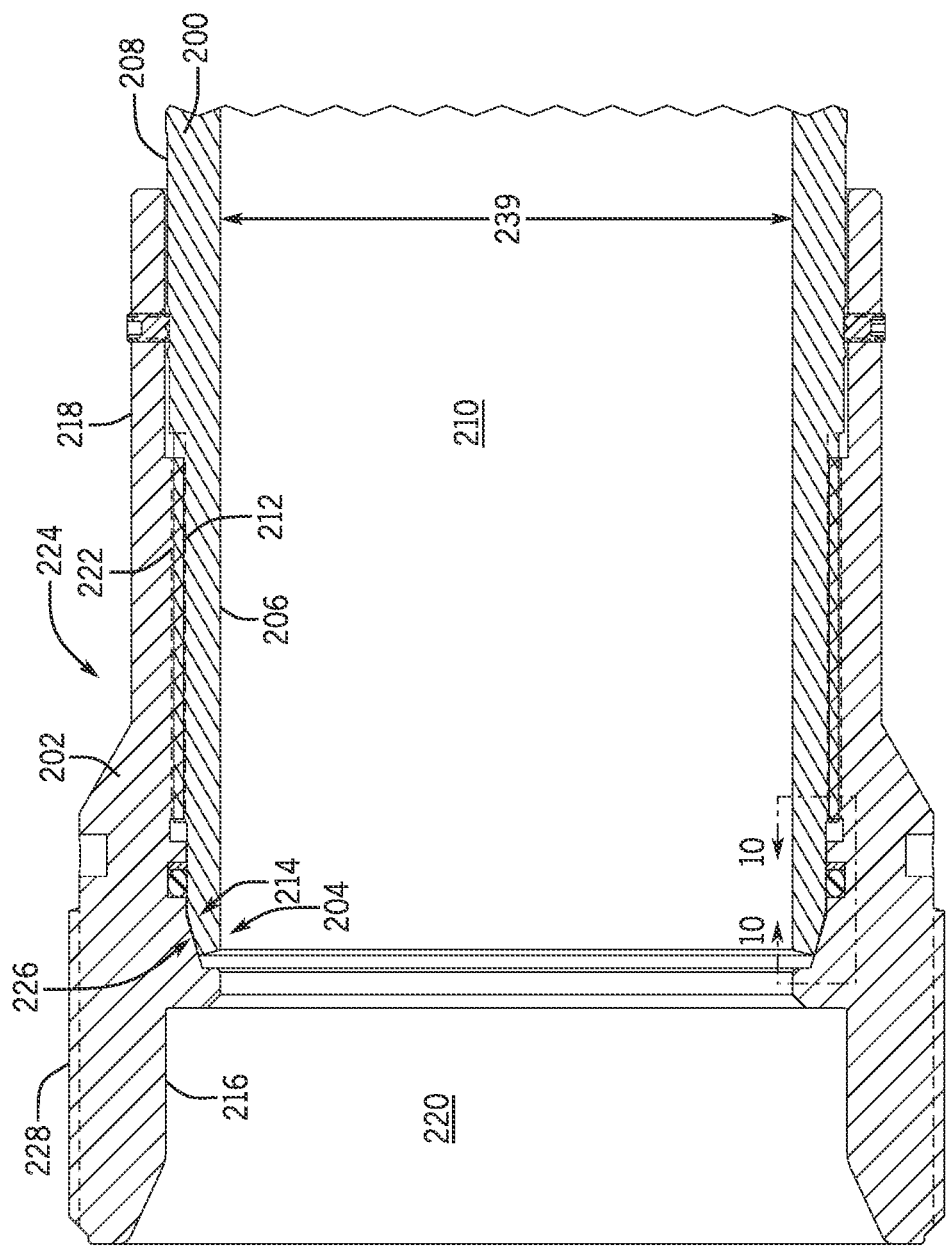
FIG. 9 is a cross-sectional side view of a seal system that may be used to form an annular seal between a first annular component and a second annular component, wherein the seal system is a nose-type seal system and may be used in the PCE stack of FIG. 2, in accordance with an embodiment of the present disclosure.
Figure 9:
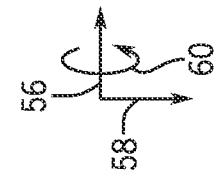

FIG. 9 is a cross-sectional side view of a first annular component 200 and a second annular component 202 that are sealed together via a seal system 204 (e.g., metal-to-metal seal system), in accordance with an embodiment of the present disclosure. It should be appreciated that the first annular component 200 may be a lubricator section, such as the lubricator section 50 of the lubricator 34 in FIG. 2, and the second annular component 202 may be a connector (e.g., part of the connector), such as the connector 52 in FIG. 2. However, as noted above, the first annular component 200 and the second annular component 202 may be any of a variety of annular components (e.g., pipes, connectors) in the PCE stack 18 of FIG. 2 or in any other type of stack or system (e.g., of the system 10 of FIG. 1 or any other system). To facilitate discussion, the first annular component 200, the second annular component 202, and the seal system 204 may also be described with reference to the vertical axis or direction 56, the radial axis or direction 58, and the circumferential axis or direction 60.

As shown, the first annular component 200 includes a radially-inner surface 206 (e.g., annular surface) and a radially-outer surface 208 (e.g., annular surface). The radially-inner surface 206 defines and surrounds a central bore 210, and the radially-outer surface 208 includes a threaded portion 212 and a sealing portion 214. The second annular component 202 includes a radially-inner surface 216 (e.g., annular surface) and a radially-outer surface 218 (e.g., annular surface). The radially-inner surface 216 defines and surrounds a central bore 220 that is configured to be fluidly coupled to the central bore 210 (e.g., coaxial). The radially-inner surface 216 also includes a threaded portion 222 that is configured to threadably couple to the threaded portion 212 to form a threaded interface 224 (e.g., threaded coupling) that joins the first annular component 200 to the second annular component 202, and the radially-inner surface 216 also includes a sealing portion 226.

In some embodiments, such as where the second annular component 202 is part of a connector (e.g., a quick union connector) that is positioned to connect the first annular component 200 to another annular component (e.g., a third annular component, such as to the first annular component 70 of FIGS. 3-7, which may be another lubricator section 50 of the lubricator 34 of FIG. 2), the radially-outer surface 218 may include one or more features (e.g., a threaded portion 228) that are configured to engage one or more corresponding features of the connector (e.g., the threaded portion 104 of the collar 102 of FIG. 3).

In operation, to couple the first annular component 200 to the second annular component 202, the first annular component 200 may be positioned within the second annular component 202. The first annular component 200 and/or the second annular component 202 may be rotated to make up the threaded interface 224 and to bring the sealing portion 214 of the first annular component 200 and the sealing portion 226 of the second annular component 202 together (e.g., along the vertical axis 56) to form a seal (e.g., annular seal). Once the sealing portions 214, 226 form the seal, the central bore 210 and the central bore 220 are fluidly coupled and sealed together, such that fluid within the central bores 210, 220 is blocked from traveling across the seal. When used within the PCE stack 18 of FIG. 2, the central bores 210, 220 may form part of the bore 24 through the PCE stack 18.

Figure 10:
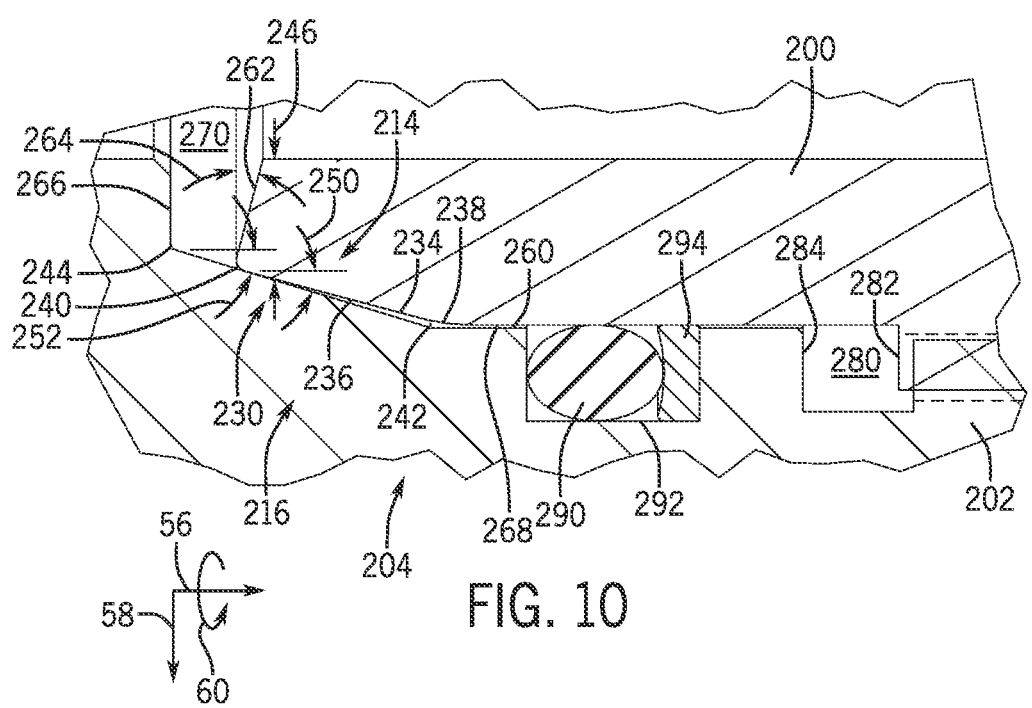
FIG. 10 is a cross-sectional side view of a portion of the seal system of FIG. 9 taken within line 10-10 of FIG. 9, in accordance with an embodiment of the present disclosure.

FIG. 10 is a cross-sectional side view of an embodiment of the seal system 204 taken within line 10-10 of FIG. 9. As shown in FIG. 10, a metal-to-metal seal interface 230 is formed by the sealing portion 214 of the first annular component 200 and the sealing portion 226 of the second annular component 202.

In particular, the sealing portion 214 of the first annular component 200 includes an angled surface 234 (e.g., frustoconical surface) and the sealing portion 214 of the second annular component 202 includes an angled surface 236 (e.g., frustoconical surface). The angled surfaces 234, 236 are configured to contact one another form the metal-to-metal seal interface 230 and to provide the seal (e.g., primary seal; metal-to-metal seal). As shown, the angled surface 234 may include a first end 238 and a second end 240, and the first end 238 may be positioned radially-outwardly of the second end 240. Similarly, the angled surface 236 may include a first end 242 and a second end 244, and the first end 242 may be positioned radially-outwardly of the second end 244. Thus, the angled surfaces 234, 236 may taper in a same direction along the vertical axis 56. In view of the taper and position of the angled surface 234, 236, the seal system 2014 may be referred to herein as a nose-type seal system (e.g., tapered end seal system).

The angled surfaces 234, 236 may have respective lengths (e.g., between respective first and second ends) that are the same or different. In some embodiments, a respective length of the angled surface 234 may be less than a respective length of the angled surface 236. In some embodiments, an inner diameter 239 (FIG. 9) of the first annular component 200 may be between approximately 8 to 20 cm, 10 to 18 cm, or 12 to 15 cm, for example. In some embodiments, the respective lengths of the angled surfaces 234, 236 may be between approximately 5 to 30 percent, 8 to 25 percent, or 10 to 20 percent of the inner diameter 239 of the first annular component 200. The first annular component 200 may have a wall thickness 246 at or around the sealing portion 214 (e.g., at any point along the angled surface 234) that is between approximately 0.5 to 3 cm, 1 to 2.5 cm, or 1.5 to 2 cm or any other suitable dimension to thereby provide appropriate stiffness and/or other properties that support the seal (e.g., enables pressure within the central bore 210 to deform the first annular component 200 to increase internal stress between the angled surfaces 234, 236).

The angled surfaces 234, 236 may be oriented at respective angles relative to the vertical axis 56, and the respective angles may be the same or different. In some embodiments, the angled surface 234 is oriented at a respective angle 250 and the angled surface 236 is oriented at a respective angled 252 that is different than the respective angle 250. For example, the respective angle 250 may be less than the respective angle 252. The respective angle 250 may be approximately 1 to 10 degrees or 1 to 5 degrees less than the respective angle 252. The respective angle 250 may be between 5 to 25 degrees, 10 to 20 degrees, or 12 to 18 degrees, and the respective angle 252 may be between 5 to 25 degrees, 10 to 20 degrees, or 12 to 18 degrees. The respective angles 250, 252 may be designed so that the respective angle 250 is less than the respective angle 252 even across all acceptable or expected manufacturing tolerances (e.g., of plus or minus 1, 2, or more degrees).

It should be appreciated that the angled surfaces 234, 236 may contact each other along an entirety of the angled surface 234, an entirety of the angled surface 236, along only a portion of the angled surface 234, and/or along only a portion of the angled surface 236. For example, the angled surface 234 may contact only a portion of the angled surface 236 that is proximate to the second end 244 of the angled surface 236 (e.g., closer to the second end 244 than the first end 242) and/or may not contact a portion of the angled surface 236 that is proximate to the first end 242 of the angled surface 236 (e.g., closer to the first end 242 than the second end 244) due to relative dimensions of the first annular component 200 and the second annular component 202 and/or due to respective angles of the angled surfaces 234, 236. For example, the respective angle 250 being less than the respective angle 252 may facilitate contact with the angled surface 236 and formation of the seal along only a portion of the angled surface 234 that is proximate to the second end 240 of the angled surface 234 (e.g., closer to the second end 240 than the first end 238). For example, as shown in FIG. 10, the angled surfaces 234, 236 may contact one another at the portion of the angled surface 234 that is proximate to the second end 240 of the angled surface 234, but the angled surfaces 234, 236 may be separated from one another (e.g., along the radial axis 58) at a portion of the angled surface 234 that is proximate to the first end 238 of the angled surface 234 (e.g., closer to the first end 238 than the second end 240).

As shown, the first annular component 200 may include a vertically-extending surface 260 on a first side of the angled surface 234, and the vertically-extending surface 260 may be generally aligned with and parallel to the vertical axis 56. The first annular component 200 may also include an end surface 262 on a second side of the angled surface 234 (e.g., the angled surface 234 may terminate at a radially-outer edge of the end surface 262). In some embodiments, the end surface 262 may be oriented at an angle 264 (e.g., back angle) relative to the radial axis 58, which may provide appropriate stiffness and/or other properties that support the seal. The angle 264 may be between be between 5 to 25 degrees, 10 to 20 degrees, or 12 to 18 degrees. Furthermore, the angle 264 may enable the second end 240 of the angled surface 234 to be closest to an end surface 266 (e.g., vertically-facing surface) of the second annular component 202 (e.g., as compared to other portions of the first annular component 200, such as compared to a radially-inner edge of the end surface 262). However, it should be appreciated that the end surface 262 may be a radially-extending surface that is generally aligned with and parallel to the radial axis 58 (e.g., and perpendicular to the vertical axis 56). Similarly, the second annular component 202 may include a vertically-extending surface 268 on a first side of the angled surface 236, and the vertically-extending surface 268 may be generally aligned with and parallel to the vertical axis 56. At least respective portions of the vertically-extending surfaces 260, 268 may be separated from one another along the radial axis 58.

Advantageously, the angled surfaces 234, 236 are configured and positioned on the first annular component 200 and the second annular component 202, respectively, such that a space 270 (e.g., a vertically-extending space or gap) is provided between the end surface 262 (e.g., vertically-facing surface) of the first annular component 200 and the end surface 266 of the second annular component 202 while the angled surfaces 234, 236 contact one another to form the seal. The end surfaces 262, 272 may be spaced apart from one another to account for manufacturing tolerances and to provide the space 270 across all acceptable or expected manufacturing tolerances. For example, the end surfaces 262, 274 may be spaced apart from one another by between approximately 0.5 to 8 millimeters (mm), 1 to 5 mm, or 2 to 4 mm. It should be appreciated that other surfaces of the first annular component 200 and the second annular component 202 may be spaced apart in a similar manner and/or by a similar amount. For example, a space 280 (e.g., a vertically-extending space or gap) is provided between a surface 282 (e.g., vertically-facing surface) of the first annular component 200 and a surface 284 (e.g., vertically-facing surface) of the second annular component 202 while the angled surfaces 234, 236 contact one another to form the seal. In this way, the other surfaces or portions of the first annular component 200 and the second annular component 202 do not interfere with or reduce the internal stress between the angled surfaces 234, 236 that enables the angled surfaces 234, 236 to provide a reliable high-pressure seal (e.g., to seal fluid, such as wellbore fluid, that has a pressure that is approximately equal to or less than about 30, 50, 60, 70, 80, 90, 100 MPa or more).

The seal system 204 may also include an annular seal element 290 (e.g., o-ring) positioned within an annular groove 292, which may be formed in the second annular component 202. The annular seal element 290 may be a non-metal material, such as an elastomer material, and may form a secondary seal (e.g., annular seal; additional or back-up seal) between the first annular component 200 and the second annular component 202. As shown, a support ring 294 may be provided in the annular groove 292 to support the annular seal element 290. However, it should be appreciated that the annular seal element 290 may have any of a variety of other configurations (e.g., c-ring; metal material).

Figure 11:
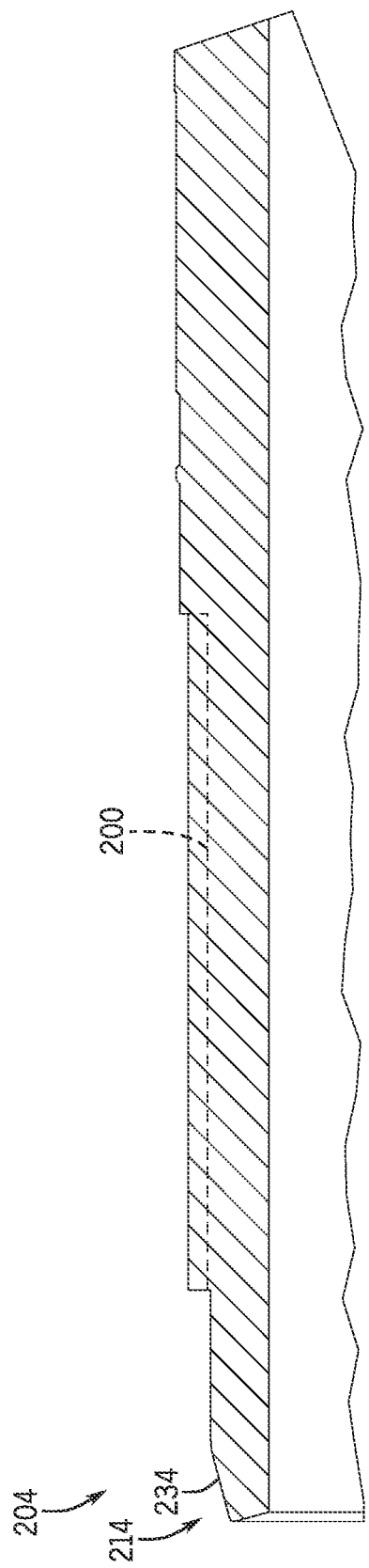
FIG. 11 is a cross-sectional side view of a portion of the first annular component of FIG. 9, in accordance with an embodiment of the present disclosure.
Figure 12:
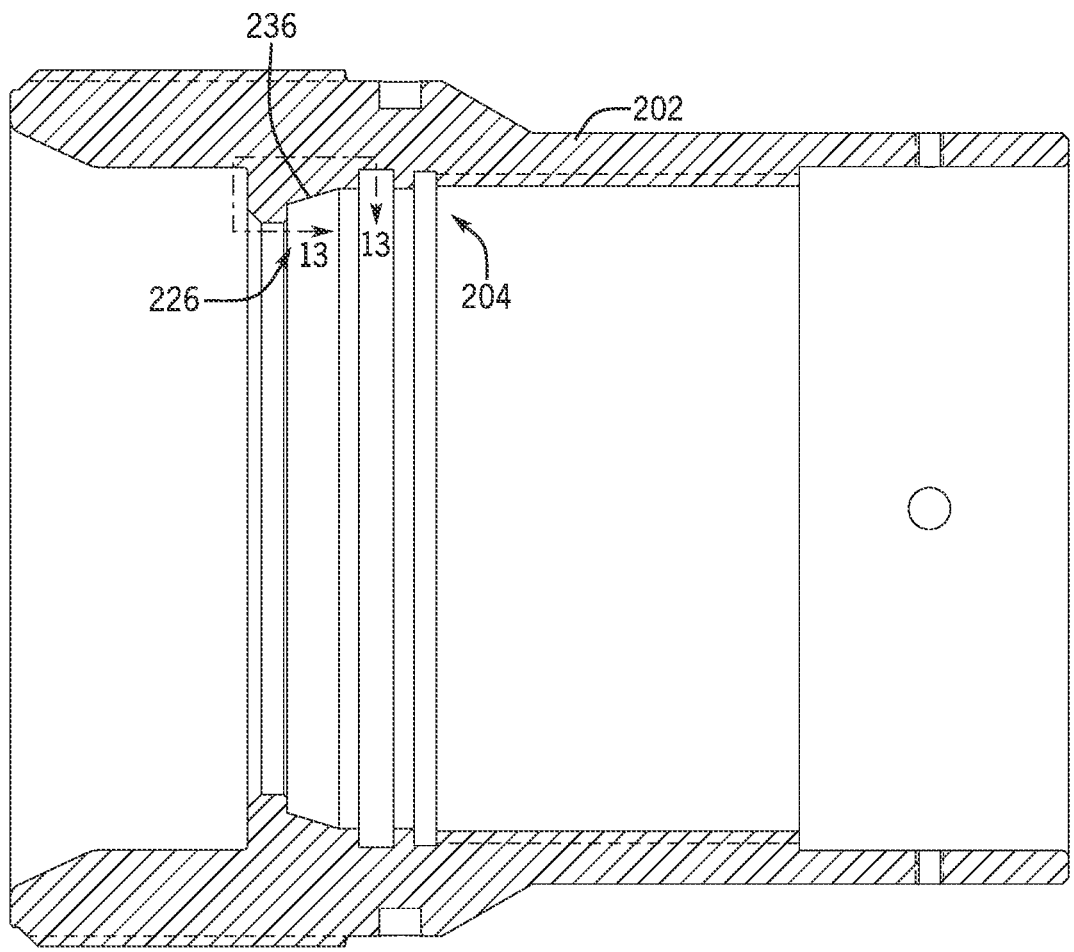
FIG. 12 is a cross-sectional side view of the second annular component of FIG. 9, in accordance with an embodiment of the present disclosure.
Figure 13:
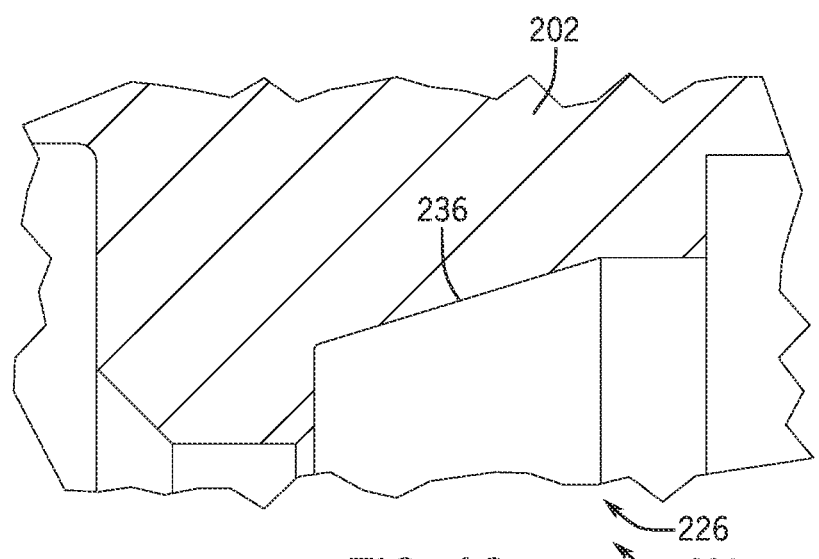
FIG. 13 is a cross-sectional side view of a portion of the second annular component of FIG. 9 taken within line 13-13 of FIG. 12, in accordance with an embodiment of the present disclosure.

FIGS. 11-13 provide additional views of components of the seal system 204. In particular, FIG. 11 is a cross-sectional side view of a portion of the first annular component 200, in accordance with an embodiment of the present disclosure. FIG. 12 is a cross-sectional side view of the second annular component 202, in accordance with an embodiment of the present disclosure. FIG. 13 is a cross-sectional side view of a portion of the second annular component 202 taken within line 13-13 of FIG. 12. It should be appreciated that the seal system 204 may be provided at a first end (e.g., end portion) and/or a second end (e.g., end portion) of the first annular component 200 to thereby seal the first annular component 200 to multiple adjacent structures (e.g., to the second annular component 202 and to an additional structure, such as an additional connector, that has features that are the same as or similar to the features of the second annular component 202). Thus, the seal system 204 may be used to couple and seal together multiple annular components to form a sealed bore (e.g., end-to-end; to form a portion of the bore 24 of the lubricator 34 of the PCE stack 18 of FIG. 2).

Thus, it should be appreciated that the seal system 74 shown in FIGS. 3-8 and the seal system 204 shown in FIGS. 9-13 may be used separately or together. For example, the seal system 74 of FIGS. 3-8 may be provided at both the first end and the second end of the first annular component 70. As another example, the seal system 204 of FIGS. 9-13 may be provided at both the first end and the second end of the first annular component 200. However, it should also be appreciated that the seal system 74 and the seal system 204 may be used together. For example, with reference to FIGS. 3 and 9, the first annular component 70 and the first annular component 200 may be fluidly coupled (e.g., sealed) to one another via the connector that includes the second annular component 72, the collar 102, and the second annular component 202. In particular, the threaded portion 104 of the collar 102 of FIG. 3 and the threaded portion 228 of the second annular component 202 of FIG. 9 may be threaded together to complete the connector and to fluidly couple the central bores 80, 90, 210, and 220 to one another (e.g., to form a portion of the bore 24 of the lubricator 34 of the PCE stack 18 of FIG. 2). Additionally, as shown in FIG. 3, an annular seal element 300 (e.g., elastomer material; metal material; o-ring; c-ring) may be provided to provide a seal (e.g., annular seal) between the second annular component 72 and the second annular component 202 of the connector.

In some such cases, the first annular component 70 and the first annular component 200 may have the same structure (e.g., may be lubricator sections 50 of FIG. 2). Therefore, the first annular component 70 may have the seal system 74 at its first end and may have the seal system 204 at its second end, and the first annular component 200 may also have the seal system 74 at its first end and may have the seal system 204 at its second end. In this way, multiple annular components (e.g., the first annular components 70, 200) may be joined end-to-end via multiple connectors (e.g., that have the second annular components 72, 202 and the collar) to form a sealed structure, such as the lubricator 34 of the PCE stack 18 of FIG. 2. Furthermore, in some embodiments, the seal systems 84, 204 may not include additional sealing features (e.g., no additional angled surfaces or annular seals; that reliably and effectively seal against high-pressure fluid) between the annular components other than the sealing features shown in FIGS. 3-13 (e.g., only the annular seal formed by the angled surfaces 114, 116 and/or the additional seal formed by the annular seal element 150; only the annular seal formed by the angled surfaces 234, 236 and/or the additional seal formed by the annular seal element 290). However, it should be appreciated that additional angled surfaces and annular seal between the annular components may be provided.

Advantageously, low torque may be sufficient for the seal system 74 shown in FIGS. 3-8 to provide the annular seal formed by the angled surfaces 114, 116 and the seal system 204 shown in FIGS. 9-13 to provide the annular seal formed by the angled surfaces 234, 236. For example, the low torque that is sufficient to form the annular seal may be between about 55 to 700 Newton meters (Nm), 70 to 600 Nm, 80 to 500 Nm, 100 to 300 Nm, or 150 to 250 Nm. The low torque that is sufficient to form the annular seal may be less than or equal to about 700, 600, 500, 400, 300, 200, 100, or 75 Nm. Without the features of the seal system 74 and the seal system 204, the torque to form annular seals between two annular components may be greater than 1000 Nm or even greater than 1500 Nm. Thus, the seal system 74 and the seal system 204 provide for efficient construction and make up operations to join (and similarly break out operations to separate) the annular components.

Furthermore, it should be appreciated that the seal system 74 and the seal system 204 may provide repeatability of the annular seal over time (e.g., may be reused 2, 3, 4, 5, or more times). Thus, the seal system 74 shown in FIGS. 3-8 may be reused to provide the annular seal formed by the angled surfaces 114, 116 after disassembly and reassembly of the annular components. Similarly, the seal system 204 shown in FIGS. 9-13 may be reused provide the annular seal formed by the angled surfaces 234, 236 after disassembly and reassembly of the annular components. The seal system 74 and the seal system 204 may provide the repeatability of the annular seal with low torque. In some cases, the torque may increase for each subsequent make up, but may remain within a range of low torque (e.g., a first low torque for the first make up, a second low torque that is greater than the first low torque for the second make up, and so on; the range of low torque may be less than 700 Nm or correspond to any other range disclosed herein).

While the disclosure may be susceptible to various modifications and alternative forms, specific embodiments have been shown by way of example in the drawings and have been described in detail herein. However, it should be noted that the disclosure is not intended to be limited to the particular forms disclosed. Rather, the disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A seal system, comprising:
 a first annular component comprising a radially-outer surface with a first threaded portion and a first sealing portion, wherein the first sealing portion comprises a first angled surface that is oriented at a first angle relative to a vertical axis;

a second annular component comprising a radially-inner surface with a second threaded portion and a second sealing portion, wherein the second sealing portion comprises a second angled surface that is oriented at a second angle relative to the vertical axis, the first angle and the second angle are between 5 and 25 degrees, the first angle is about 1 to 10 degrees less than the second angle, and lengths of the first angled surface and the second angled surface are within 2 to 20 percent of an inner diameter of the first annular component; and an annular collar disposed at least partially about the second annular component, wherein the second annular component is radially between the first annular component and the annular collar, the annular collar comprises a first radial protrusion that axially abuts against a second radial protrusion of the second annular component, the annular collar comprises a third threaded portion separate from the first threaded portion and the second threaded portion, and the second radial protrusion is disposed axially between the first radial protrusion and the third threaded portion;

wherein the first annular component and the second annular component are configured to threadably couple to one another via the first threaded portion and the second threaded portion and to form a metal-to-metal seal against one another via the first angled surface and the second angled surface.

2. The seal system of claim 1, wherein the first angled surface is disposed directly between first opposite cylindrical surfaces along the radially-outer surface of the first annular component, and the second angled surface is disposed directly between second opposite cylindrical surfaces along the radially-inner surface of the second annular component.

3. The seal system of claim 1, wherein the first annular component is formed from a first material having a first yield strength, the second annular component is formed from a second material having a second yield strength, the first material comprises a high alloy steel and the second material comprises a low alloy steel, and the second yield strength is between 5 and 50 percent of the first yield strength.

4. The seal system of claim 1, wherein the annular collar and the second annular component are radially offset to define an annular space, the third threaded portion of the annular collar faces the annular space, and a seal of the second annular component faces the annular space.

5. The seal system of claim 1, comprising an annular seal element configured to form an additional seal between the first annular component and the second annular component, wherein the metal-to-metal seal is a primary seal and the additional seal is a secondary seal.

6. The seal system of claim 1, wherein the first annular component comprises a first end surface, the second annular component comprises a second end surface, and a gap is provided between the first end surface and the second end surface while the first annular component and the second annular component are threadably coupled to one another via the first threaded portion and the second threaded portion and while the metal-to-metal seal is formed via the first angled surface and the second angled surface.

7. The seal system of claim 1, comprising a lubricator of a pressure control equipment stack, wherein the seal system couples together a plurality of lubricator sections of the lubricator.

8. A lubricator for a pressure control equipment stack, the lubricator comprising:

a first annular lubricator section comprising a radially-outer surface with a first threaded portion and a first sealing portion, wherein the first sealing portion comprises a first angled surface that is oriented at a first angle relative to a vertical axis;

a first annular connector component comprising a radially-inner surface with a second threaded portion and a second sealing portion, wherein the second sealing portion comprises a second angled surface that is oriented at a second angle relative to the vertical axis, the first angle and the second angle are between 5 and 25 degrees, the first angle is about 1 to 10 degrees less than the second angle, and lengths of the first angled surface and the second angled surface are within 2 to 20 percent of an inner diameter of the first annular lubricator section; and an annular collar disposed at least partially about the first annular connector component, wherein the first annular connector component is radially between the first annular lubricator section and the annular collar, the annular collar comprises a first radial protrusion that axially abuts against a second radial protrusion of the first annular connector component, the annular collar comprises a third threaded portion separate from the first threaded portion and the second threaded portion, and the second radial protrusion is disposed axially between the first radial protrusion and the third threaded portion;

wherein the first annular lubricator section and the first annular connector component are configured to couple to one another via the first threaded portion and the second threaded portion and to form a metal-to-metal seal against one another via the first angled surface and the second angled surface.

9. The lubricator of claim 8, wherein the annular collar and the first annular connector component are radially offset to define an annular space, the third threaded portion of the annular collar faces the annular space, and a seal of the first annular connector component faces the annular space.

10. The lubricator of claim 8, wherein the first angled surface is disposed directly between first opposite cylindrical surfaces along the radially-outer surface of the first annular lubricator section, and the second angled surface is disposed directly between second opposite cylindrical surfaces along the radially-inner surface of the first annular connector component.

11. The lubricator of claim 8, wherein the first annular lubricator section comprises a first material having a first yield strength, the second annular connector component comprises a second material having a second yield strength, the first material and the second material are different from one another, and the first yield strength is greater than the second yield strength.

12. The lubricator of claim 8, comprising an annular seal element configured to form an additional seal between the first annular lubricator section and the first annular connector component.

13. The lubricator of claim 8, wherein the first annular lubricator section comprises a first end surface, the first annular connector component comprises a second end surface, and a gap is provided between the first end surface and the second end surface while the first annular lubricator section and the first annular connector component are coupled to one another and while the metal-to-metal seal is formed via the first angled surface and the second angled surface.

14. The lubricator of claim 8, comprising:
a second annular lubricator section comprising a respective radially-outer surface with a fourth sealing portion, wherein the fourth sealing portion comprises a third angled surface that is oriented at a third angle relative to the vertical axis; and
a second annular connector component comprising a respective radially-inner surface with a fifth sealing portion, wherein the fifth sealing portion comprises a fourth angled surface that is oriented at a fourth angle relative to the vertical axis, and the fourth angle is different from the third angle;
wherein the second annular lubricator and the second annular connector component are configured to couple to one another and to form a second metal-to-metal seal against one another via the third angled surface and the fourth angled surface.

15. The lubricator of claim 14, wherein the annular collar is configured to couple the first annular connector component and the second annular connector component to one another to thereby fluidly couple the first annular lubricator section to the second annular lubricator section, wherein the first angled surface, the second angled surface, and the metal-to-metal seal form an intermediate bevel-type seal system, wherein the third angled surface, the fourth angled surface, and the second metal-to-metal seal form a tapered end seal system.

16. The lubricator of claim 8, wherein the first angled surface and the second angled surface first contact one another only at an end portion of the first angled surface closest to an axial end of the first annular lubricator section.

17. A method of sealing a first annular component to a second annular component, the method comprising:
positioning the first annular component within the second annular component, wherein the first annular component comprises a first threaded portion and the second annular component comprises a second threaded portion;
rotating at least one of the first annular component and the second annular component to thereby threadably couple the first annular component to the second annular component via a threaded interface of the first threaded portion and the second threaded portion and until only a first portion of a first angled surface of the first annular component contacts and forms a metal-to-metal seal against only a second portion of a second angled surface of the second annular component, the first angled surface is oriented at a first angle relative to a vertical axis, the second angled surface is oriented at a second angle relative to the vertical axis, the first angle and the second angle are between 5 and 25 degrees, the first angle is about 1 to 10 degrees less than the second angle, and lengths of the first angled surface and the second angled surface are within 2 to 20 percent of an inner diameter of the first annular component; and positioning an annular collar at least partially about the second annular component, wherein the second annular component is radially between the first annular component and the annular collar, the annular collar comprises a first radial protrusion that axially abuts against a second radial protrusion of the second annular component, the annular collar comprises a third threaded portion separate from the first threaded portion and the second threaded portion, and the second radial protrusion is disposed axially between the first radial protrusion and the third threaded portion.

18. The method of claim 17, comprising forming the metal-to-metal seal via low torque of less than 600 Newton meters.

19. The method of claim 17, wherein the first angled surface is disposed directly between first opposite cylindrical surfaces along a radially-outer surface of the first annular component, and the second angled surface is disposed directly between second opposite cylindrical surfaces along a radially-inner surface of the second annular component.

20. The method of claim 17, wherein the first annular component comprises a lubricator section, and the second annular component comprises a connector.

* * * * *